(12) United States Patent
Venkataraman et al.

(10) Patent No.: US 12,183,344 B1
(45) Date of Patent: Dec. 31, 2024

(54) SYSTEMS AND METHODS FOR DETERMINING A NEXT ACTION BASED ON ENTITIES AND INTENTS

(71) Applicant: Wells Fargo Bank, N.A., San Francisco, CA (US)

(72) Inventors: Vinothkumar Venkataraman, Bangalore (IN); Rahul Ignatius, Bangalore (IN); Naveen Gururaja Yeri, Bangalore (IN); Paul Davis, Irving, TX (US)

(73) Assignee: Wells Fargo Bank, N.A., San Francisco, CA (US)

( * ) Notice: Subject to any disclaimer, the term of this patent is extended or adjusted under 35 U.S.C. 154(b) by 464 days.

(21) Appl. No.: 17/456,491

(22) Filed: Nov. 24, 2021

(51) Int. Cl.
*G10L 15/26* (2006.01)

(52) U.S. Cl.
CPC .................................. *G10L 15/26* (2013.01)

(58) Field of Classification Search
CPC ........................................................ G10L 15/26
See application file for complete search history.

(56) References Cited

U.S. PATENT DOCUMENTS

| | | | |
|---|---|---|---|
| 8,238,541 B1 | 8/2012 | Kalavar | |
| 8,688,453 B1 | 4/2014 | Joshi et al. | |
| 10,032,451 B1* | 7/2018 | Mamkina | G10L 15/22 |
| 10,277,743 B1* | 4/2019 | Agarwal | G06F 40/216 |
| 10,600,406 B1* | 3/2020 | Shapiro | G10L 15/22 |
| 10,706,841 B2* | 7/2020 | Gruber | G06F 40/40 |
| 10,761,866 B2* | 9/2020 | Liu | G06F 16/9038 |
| 11,087,739 B1* | 8/2021 | Rastrow | G10L 15/30 |
| 11,250,876 B1 | 2/2022 | McCloskey et al. | |
| 11,735,207 B1* | 8/2023 | Venkataraman | G10L 15/26 704/200 |
| 2004/0082839 A1 | 4/2004 | Haugen | |
| 2009/0002178 A1 | 1/2009 | Guday et al. | |
| 2014/0163960 A1 | 6/2014 | Dimitriadis et al. | |
| 2014/0244249 A1 | 8/2014 | Mohamed et al. | |
| 2015/0193718 A1 | 7/2015 | Shaburov et al. | |
| 2015/0288818 A1 | 10/2015 | Srivastava et al. | |
| 2016/0071126 A1 | 3/2016 | Chang et al. | |
| 2017/0116177 A1 | 4/2017 | Walia | |
| 2017/0169101 A1 | 6/2017 | Walia et al. | |

(Continued)

FOREIGN PATENT DOCUMENTS

| | | |
|---|---|---|
| EP | 3706402 A1 | 9/2020 |
| GB | 2591245 A | 7/2021 |

OTHER PUBLICATIONS

Translation of WO2022186435 by Choi with original document, 2022.*

(Continued)

*Primary Examiner* — Paras D Shah
(74) *Attorney, Agent, or Firm* — K&L Gates LLP

(57) ABSTRACT

Systems, apparatuses, methods, and computer program products are disclosed for predicting an entity and intent based on captured speech. An example method includes capturing speech and converting the speech to text. The example method further includes causing generation of one or more entities and one or more intents based on the speech (Continued)

and the text. The example method further includes determining a next action based on each of the one or more entities and each of the one or more intents.

21 Claims, 8 Drawing Sheets

(56) References Cited

U.S. PATENT DOCUMENTS

| | | | |
|---|---|---|---|
| 2018/0248746 A1 | | 8/2018 | Deluca et al. |
| 2018/0285641 A1 | | 10/2018 | Yan et al. |
| 2018/0303397 A1 | | 10/2018 | Krupat et al. |
| 2018/0308487 A1 | | 10/2018 | Goel et al. |
| 2020/0104616 A1 | | 4/2020 | el Kaliouby et al. |
| 2020/0356999 A1 | | 11/2020 | Pandey et al. |
| 2020/0394269 A1* | | 12/2020 | Seibel .................. G06F 40/284 |
| 2021/0043099 A1 | | 2/2021 | Du et al. |
| 2021/0050033 A1 | | 2/2021 | Bui et al. |
| 2021/0082412 A1* | | 3/2021 | Kennewick ............ G10L 13/08 |
| 2021/0097267 A1 | | 4/2021 | Stokman et al. |
| 2021/0192332 A1 | | 6/2021 | Gangotri et al. |
| 2021/0287656 A1 | | 9/2021 | Bonafonte et al. |
| 2022/0043938 A1 | | 2/2022 | Kochura et al. |
| 2022/0044265 A1 | | 2/2022 | Wilbert et al. |
| 2023/0045930 A1* | | 2/2023 | Can .......................... G10L 15/08 |
| 2023/0095215 A1* | | 3/2023 | Cheaz ................... G06F 16/958 |
| | | | 707/728 |
| 2024/0161744 A1* | | 5/2024 | Park ........................ G06F 3/16 |

OTHER PUBLICATIONS

Ilyas, Chaudhary Muhammad Aqdus, et al. "Deep Emotion Recognition through Upper Body Movements and Facial Expression." VISIGRAPP (5: VISAPP). 2021. (Year: 2021).

Wei, Gou, Li Jian, and Sun Mo. "Multimodal (audio, facial and gesture) based emotion recognition challenge." 2020 15th IEEE International Conference on Automatic Face and Gesture Recognition (FG 2020). IEEE, 2020. (Year: 2020).

Zen, Gloria, et al., Learning Personalized Models for Facial Expression Analysis and Gesture Recognition, IEEE Transactions on Multimedia (vol. 18, Issue: 4, Apr. 2016).

Mustaqeem, M. Sajjad and S. Kwon, "Clustering-Based Speech Emotion Recognition by Incorporating Learned Features and Deep BILSTM," in IEEE Access, vol. 8, pp. 79861-79875, 2020, doi: 10.1109/ACCESS.2020.2990405.

Robinson, Kerry, "Natural language IVR—what, why, how?," VoxGen Limited, Sep. 27, 2019.

Nuance website, https://www.nuance.com/omni-channel-customer-engagement/technologies/natural-language-understanding, 2021.

SmartAction website, https://www.smartaction.ai/intelligent-front-door/, 2021.

* cited by examiner

302

Customer Information:
Name: xxxx xxxxx
Phone Number: xxx-xxx-xxxx
Email address: xxxxxx@xxx.com Current Call Wait Time: x:xx:xx
Customer Issue: xxx xxxx xxxx xxxx Entity: Mortgage
Customer Intent: Missed mortgage payment fees Was Call Escalated: [Yes/No]

NEXT Action:
Transfer to Agent xxx xxxx

FIG. 3

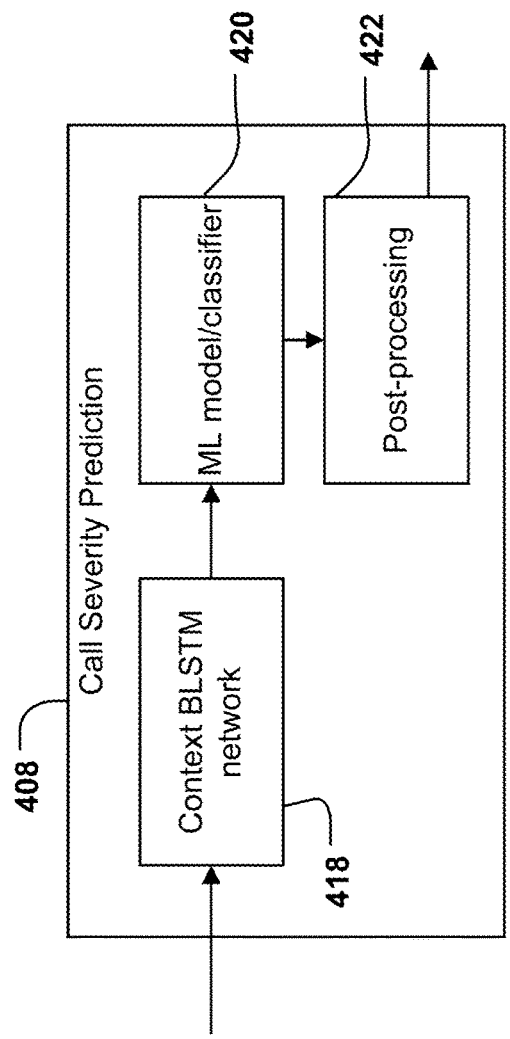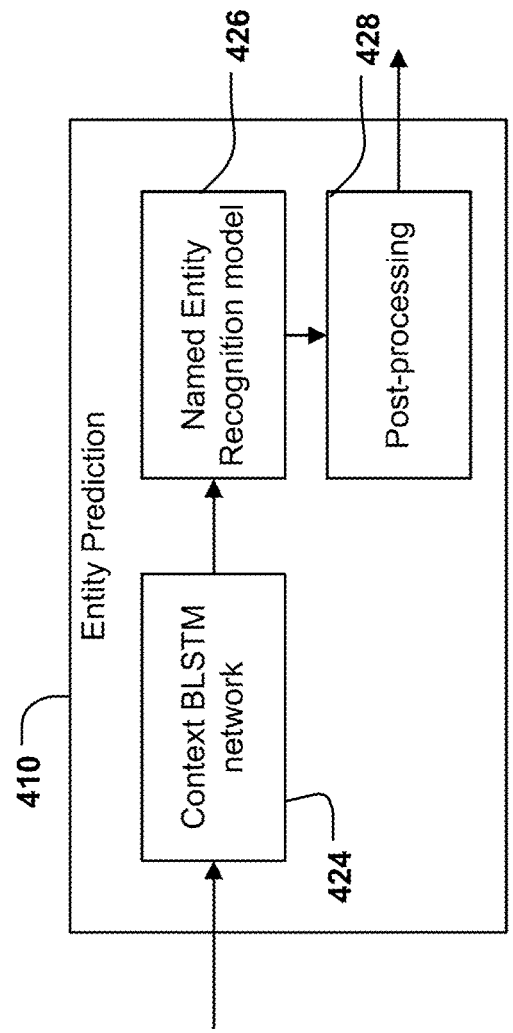
FIG. 4B
FIG. 4C

SYSTEMS AND METHODS FOR DETERMINING A NEXT ACTION BASED ON ENTITIES AND INTENTS

TECHNOLOGICAL FIELD

Example embodiments of the present disclosure relate generally to predicting an entity and intent based on captured speech and, more particularly, to systems and methods for determining a next action based on one or more predicted entities and one or more predicted intents, the one or more predicted entities and the one or more predicted intents based on captured speech.

BACKGROUND

Many institutions, such as banks and other service and product providers, offer Interactive Voice Response (IVR) systems. Currently, customers or other users who call in to customer service centers are routed through different IVR paths based on choices that the customer makes (e.g., selecting an option from a menu of options). It takes, at least, several minutes before the customer is routed to an agent or the final IVR point. The current call routing methodologies are not intelligent, but are rules-based (e.g., based on customer selections from the generic or broad IVR menus). Calls are not assigned or re-directed to agents based on anything more than the previously mentioned selections. Further, there is currently no way for an IVR system to understand the intent displayed by a customer. This lack of personalization decreases customer satisfaction. For example, rules-based systems may cause certain customers to experience longer delays than they would experience in a more personalized interaction, thus exacerbating any potential frustration or anger the customer had already experienced prior to the call.

BRIEF SUMMARY

Entity and intent predictions are not utilized by IVR systems today. For instance, one or more entity predictions, and/or one or more intent predictions (e.g., main intent and sub-intents) are not utilized when determining where and how to redirect customer calls to maximize customer satisfaction and/or minimize customer dis-satisfaction.

Accordingly, Applicant has recognized a need for systems, methods, and apparatuses for predicting one or more entities and one or more intents based on captured speech, the predicted one or more entities and one or more intents being utilized to ensure that a customer call is routed quickly and properly. Utilizing the context of a customer's speech, based on the text derived from the speech, as well as acoustic features derived from actual audio of the customer's speech, example embodiments detect one or more customer intents for use in directing a call or reaching a prompt resolution, as well as detecting one or more entities in relation to or corresponding to the customer's issue or call/interaction. Moreover, Applicant has recognized a need to utilize this combination to create a process that is more efficient than typical IVR systems. To this end, example systems described herein analyze the speech captured from a customer's call and text derived from the audio or speech. Based on this analysis, example embodiments may predict one or more entities and one or more customer intents, which in turn may be utilized in transferring or re-directing a call and/or in determining a solution or other action.

Systems, apparatuses, methods, and computer program products are disclosed herein for predicting one or more entities and one or more intents based on captured speech and/or text derived from the captured speech. The predicted one or more entities and one or more intents may be utilized to determine the next best action or personalized action. For instance, the customer's call may be directed to an agent of or in a particular entity, the agent capable of handling the intended purpose of the customer's call. For example, as a customer calls into an IVR system, the customer may be prompted to give a response. As the customer provides a response, the customer's response may be captured, and the response analyzed to determine one or more predicted entities and one or more predicted intents of each discrete segment. Based on such one or more predicted entities and one or more predicted intents, the call may or may not be transferred to a live agent or a particular IVR menu, each part of one of the one or more predicted entities.

In one example embodiment, a method is provided for predicting an entity and intent based on captured speech. The method may include receiving, by a communications circuitry, a reply comprising speech. The method may include converting, by an automated speech recognition circuitry, speech to text. The method may include causing, by an entity and intent prediction circuitry, generation of one or more entities and one or more intents based on the speech and the text. The method may finally include determining, by a call processing circuitry, a next action based on each of the one or more entities and each of the one or more intents.

The method may further include causing, by the entity and intent prediction circuitry, generation of a relevancy score for each of the one or more intents. In an embodiment, the next action may further be determined based on every generated relevancy score. In another the embodiment, the method may include ranking, by the entity and intent prediction circuitry, each of the one or more intents based on its corresponding relevancy score. The method may include classifying, by the entity and intent prediction circuitry, each of the one or more intents as a main intent or a sub-intent based on ranking. In an embodiment, the next action may further be based on the main intent.

The method may further include determining, by the call processing circuitry, one or more additional actions based on each of the one or more entities and each of the one or more intents classified as sub-intents. The method may include performing, by the call processing circuitry, the next action. The method may include, in response to receiving an indication that the next action is complete, performing the one or more additional actions.

In an embodiment, each of the one or more entities may comprise one or more of a business entity, a product or service entity, business segment, call service entity, call service division or segment, service center, or customer service center. In another embodiment, the reply may comprise speech of a customer during a customer call. Further, each of the one or more intents may comprise a purpose for the call. In an embodiment, the purpose for the call may be known or unknown by the customer.

In an embodiment, the entity and intent prediction circuitry includes a custom named entity recognition model, and wherein generation of the one or more entities uses the custom named entity recognition model.

In an embodiment, the method may include, prior to determining a next action, determining, by the entity and intent prediction circuitry, a severity based on the speech and the text, and wherein the next action is further based on the severity. The severity may either be a regular severity or an escalated severity. If the severity is an escalated severity, the next action may include transferring a call associated with the speech and text to an agent.

In one example embodiment, an apparatus is provided for predicting an entity and intent based on captured speech. The apparatus may include communications circuitry. The communications circuitry may be configured to receive a reply comprising speech. The apparatus may include automated speech recognition circuitry. The automated speech recognition circuitry may be configured to convert the speech to text. The apparatus may include entity and intent prediction circuitry. The entity and intent prediction circuitry may be configured to cause generation of one or more entities and one or more intents based on the speech and the text. The apparatus may include call processing circuitry. The call processing circuitry may be configured to determine a next action based on each of the one or more entities and each of the one or more intents.

In an embodiment, the entity and intent prediction circuitry may cause generation of a relevancy score for each of the one or more intents. The entity and intent prediction circuitry may rank each of the one or more intents based on the relevancy score. The entity and prediction circuitry may use a one vs. rest support vector machine model to generate the relevancy score for each of the one or more intents and to rank each of the one or more intents.

In one example embodiment, a computer program product is provided for predicting an entity and intent based on captured speech, the computer program product comprising at least one non-transitory computer-readable storage medium storing software instructions that, when executed, cause an apparatus to perform various operations and/or processes. The computer program product may be configured to receive a reply comprising speech. The computer program product may be configured to convert the speech to text. The computer program product may be configured to cause generation of one or more entities and one or more intents based on the speech and the text. The computer program product may be configured to determine a next action based on each of the one or more entities and each of the one or more intents.

In another embodiment, the computer program product may be configured to cause generation of a severity based on the speech and the text.

In another embodiment, the next action may comprise one or more of re-directing a call from an IVR menu to another IVR menu, selecting an agent based on the one or more entities and the one or more intents, generating a customer's personalized product or service recommendation, re-directing a call based on the customer's personalized product or service recommendation, determining an agent's rating or ranking, generating a call back for a customer, or transferring a call from the IVR menu to an agent.

The foregoing brief summary is provided merely for purposes of summarizing example embodiments illustrating some aspects of the present disclosure. Accordingly, it will be appreciated that the above-described embodiments are merely examples and should not be construed to narrow the scope of the present disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments of the present disclosure in general terms above, reference will now be made to the accompanying drawings, which are not necessarily drawn to scale. Some embodiments may include fewer or more components than those shown in the figures.

FIG. 3 illustrates an example graphical user interface (GUI) used in some example embodiments described herein.

FIGS. 4A, 4B, 4C, and 4D illustrate other example schematic block diagrams used in some example embodiments described herein.

DETAILED DESCRIPTION

Figure 1:
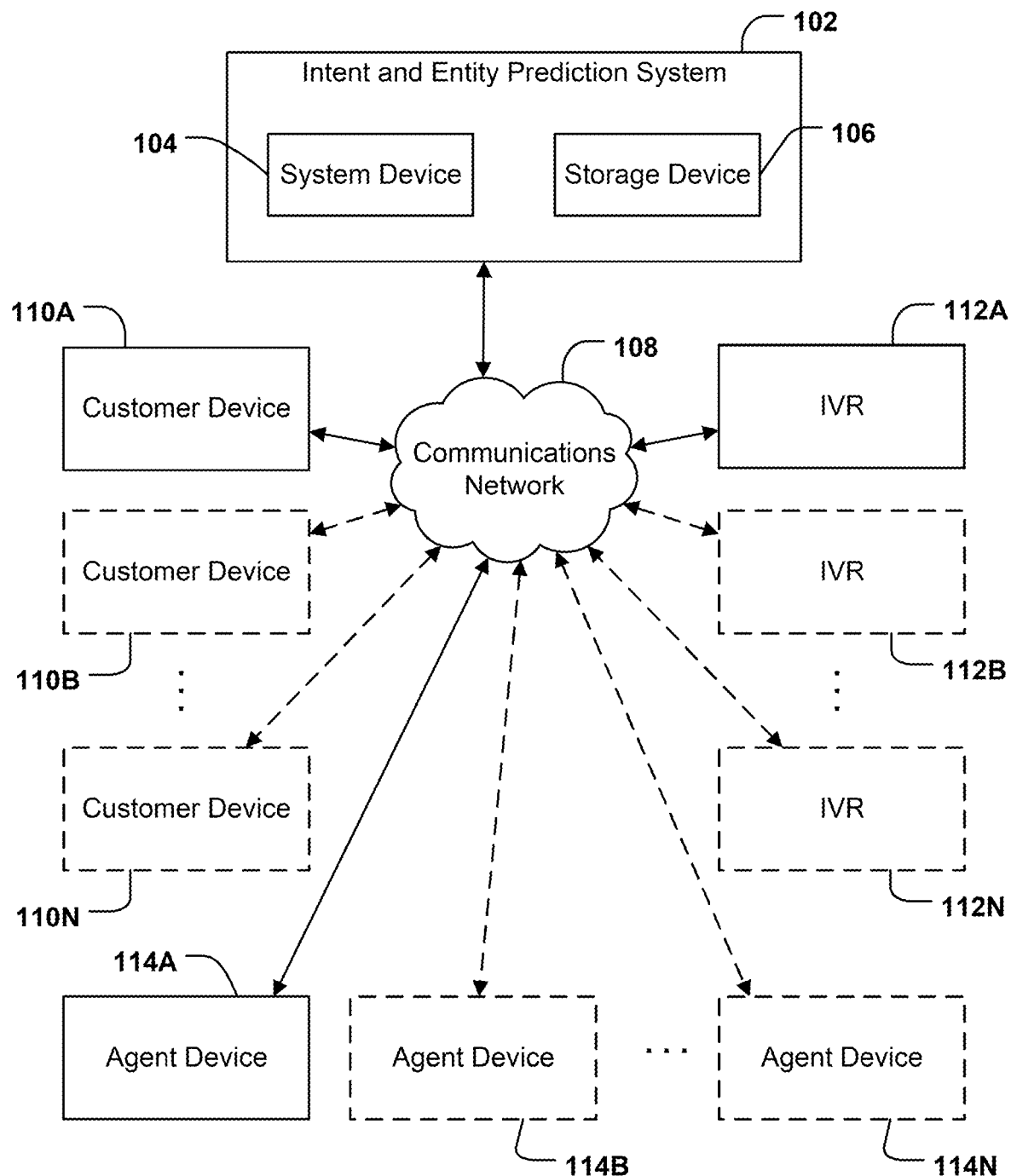
FIG. 1 illustrates a system in which some example embodiments may be used.

Some embodiments of the present disclosure will now be described more fully hereinafter with reference to the accompanying figures, in which some, but not all, embodiments of the disclosures are shown. Indeed, these disclosures may be embodied in many different forms and should not be construed as limited to the embodiments set forth herein; rather, these embodiments are provided so that this disclosure will satisfy applicable legal requirements.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" is used to refer to any computing device capable of functioning as a server, such as a master exchange server, web server, mail server, document server, or any other type of server. A server may be a dedicated computing device or a server module (e.g., an application) hosted by a computing device that causes the computing device to operate as a server.

Overview

As noted above, methods, apparatuses, systems, and computer program products are described herein that provide for predicting an entity and intent based on captured speech and, based on the entity and intent, providing a next action, next best action, or personalized action for a customer call. Traditionally, customer service interactions utilize an IVR system. It can take a long time until a customer's issue is resolved or until the customer's call is directed to the proper person. As a call takes longer, customers may grow frustrated and/or angry, but calls will continue on the same path. While a customer's intent, in addition to intended entity, could be given as feedback after the fact, there is no way for a customer's intent to be utilized in determining the best route for the call real-time and/or continuously. There is no way to customize a customer's route through an IVR system. In addition, there is typically no way to determine which employees from a particular entity may be most suited to handle a particular intent (e.g., no personalized solution). Further, employees are not evaluated or prioritized based on how they handle particular predicted intents and calls are not re-directed to different employees based on such evaluations.

In contrast to conventional techniques for determining one intent based only on audio or text, the present disclosure describes determining one or more entities and one or more intents and/or one or more probabilities indicating one or more intents based on speech and text derived from the speech or discrete segments of the speech (e.g., each sentence in speech or portion of a sentence). Further, the determined entity, intents, or probabilities may be utilized to determine a best call route or re-direction, and also to optimize which employees or call center agents receive calls based on predicted entity and intents. To address the issues described herein, when a customer calls in, the customer's speech or reply may be captured. All or a portion of the captured speech may be transmitted for audio pre-processing. The pre-processing steps or operations may reduce noise and/or determine a speech endpoint, among other features. The pre-processed audio may then be sent to an automated speech recognition (ASR) module or circuitry. The ASR circuitry may convert the audio to text. In some embodiments, the text may then be separated into a plurality of discrete segments associated with a time that each discrete segment is received or associated with each sentence received. Each discrete segment may then be weighted, by the speech pre-processing circuitry or ASR circuitry, based on a time each discrete segment is received. An entity and intent prediction circuitry may determine an entity or one or more entities based on the speech and text derived from the speech or on each discrete segments. The entity and intent prediction circuitry may cause generation of an intent based on the speech and text derived from the speech or each of the discrete segments. A call processing circuitry or module may determine a next action based on each determined entity and each generated intent.

Such operations may be performed or caused by or via machine learning models. For example, entity prediction may be determined via a named entity recognition model, among other machine learning models. Each of the intents may be generated by a support vector machine (SVM), among other machine learning models. Further, each of the intents may be generated based on context hidden vectors. The context hidden vectors may be generated via a context Bidirectional Long Short-Term Memory (BLSTM).

Accordingly, the present disclosure sets forth systems, methods, and apparatuses that accurately predict one or more entities and one or more intents based on captured speech and/or text derived from the captured speech or a portion or discrete segment. There are many advantages of these and other embodiments described herein. For instance, reduced call time waiting. As a customer calls into customer service, rather than waiting to get through multiple IVR menus, if a customer's intent and entity is determined initially and/or continuously, the system or apparatus may ensure the call is handled in a particular way (e.g., escalation) and by the proper entity (e.g., an agent representing a particular entity or business segment or unit). Such an action and/or other actions describe herein may increase customer satisfaction. In particular, as customer call wait times are reduced, customer satisfaction will increase. Finally, customers may be transferred or redirected to proper call center agents and, further, the call center agents may be evaluated and classified based on the call center agent's handling of a customer with a particular intent. For instance, as a customer's intent is predicted, the call may be re-directed to a call center agent with experience handling customer's with such an intent or similar intents.

Moreover, the systems, methods, and apparatuses set forth an improvement to operational execution and efficiency when compared to conventional IVR systems. By making a dynamic determination based on intent and entity, the described systems, methods, and apparatuses improve the accuracy of routing a customer call to the correct destination. Improved accuracy can provide the benefit of reduced computing resources required to route a customer call, and reduced IVR menu complexity, among other benefits.

Although a high-level explanation of the operations of example embodiments has been provided above, specific details regarding the configuration of such example embodiments are provided below.

System Architecture

Example embodiments described herein may be implemented using any of a variety of computing devices or servers. To this end, FIG. 1 illustrates an example environment within which embodiments of the present disclosure may operate. As illustrated, an intent and entity prediction system 102 may include a system device 104 in communication with a storage device 106. Although system device 104 and storage device 106 are described in singular form, some embodiments may utilize more than one system device 104 and/or more than one storage device 106. Additionally, some embodiments of the intent and entity prediction system 102 may not require a storage device 106 at all. Whatever the implementation, the intent and entity prediction system 102, and its constituent system device(s) 104 and/or storage device(s) 106 may receive and/or transmit information via communications network 108 (e.g., the Internet) with any number of other devices, such as one or more of customer device 110A, customer device 110B, through customer device 110N, IVR 112A, IVR 112B, through IVR 112N, and/or agent device 114A, agent device 114B, through agent device 114N.

System device 104 may be implemented as one or more servers, which may or may not be physically proximate to other components of intent and entity prediction system 102. Furthermore, some components of system device 104 may be physically proximate to the other components of the intent and entity prediction system 102 while other components are not. System device 104 may receive, process, generate, and transmit data, signals, and electronic information to facilitate the operations of the intent and entity prediction system 102. Particular components of system device 104 are described in greater detail below with reference to apparatus 200 in connection with FIG. 2.

Storage device 106 may comprise a distinct component from system device 104, or may comprise an element of system device 104 (e.g., memory 204, as described below in connection with FIG. 2). Storage device 106 may be embodied as one or more direct-attached storage (DAS) devices (such as hard drives, solid-state drives, optical disc drives, or the like) or may alternatively comprise one or more Network Attached Storage (NAS) devices independently connected to a communications network (e.g., communications network 108). Storage device 106 may host the software executed to operate the intent and entity prediction system 102. Storage device 106 may store information relied upon during operation of the intent and entity prediction system 102, such as various audio recordings and speech-to-text files that may be used by the intent and entity prediction system 102, data and documents to be analyzed using the intent and entity prediction system 102, or the like. In addition, storage device 106 may store control signals, device characteristics, and access credentials enabling interaction between the intent and entity prediction system 102 and one or more of the customer devices 110A-110N, IVRs 112A-112N, or agent devices 114A-114N.

The one or more IVRs 112A-112N may be embodied by any storage devices known in the art. Similarly, the one or more customer device 112A-112N and/or agent device 114A-114N may be embodied by any computing devices known in the art, such as desktop or laptop computers, tablet devices, smartphones, or the like. The one or more customer devices 110A-110N, the one or more IVRs 112A-112N, and the one or more agent devices 114A-114N need not themselves be independent devices, but may be peripheral devices communicatively coupled to other computing devices.

Although FIG. 1 illustrates an environment and implementation of the present disclosure in which the intent and entity prediction system 102 interacts with one or more of customer devices 110A-110N, IVRs 112A-112N, and/or agent devices 114A-114N, in some embodiments one or more of the users or agents may directly interact with the intent and entity prediction system 102 (e.g., via input/output circuitry of system device 104), in which case a separate device may not need to be utilized for such users or agents. Whether by way of direct interaction or interaction via a separate device, users and agents may communicate with, operate, control, modify, or otherwise interact with the intent and entity prediction system 102 to perform functions described herein and/or achieve benefits as set forth in connection with this disclosure.

Example Implementing Apparatuses

Figure 2:
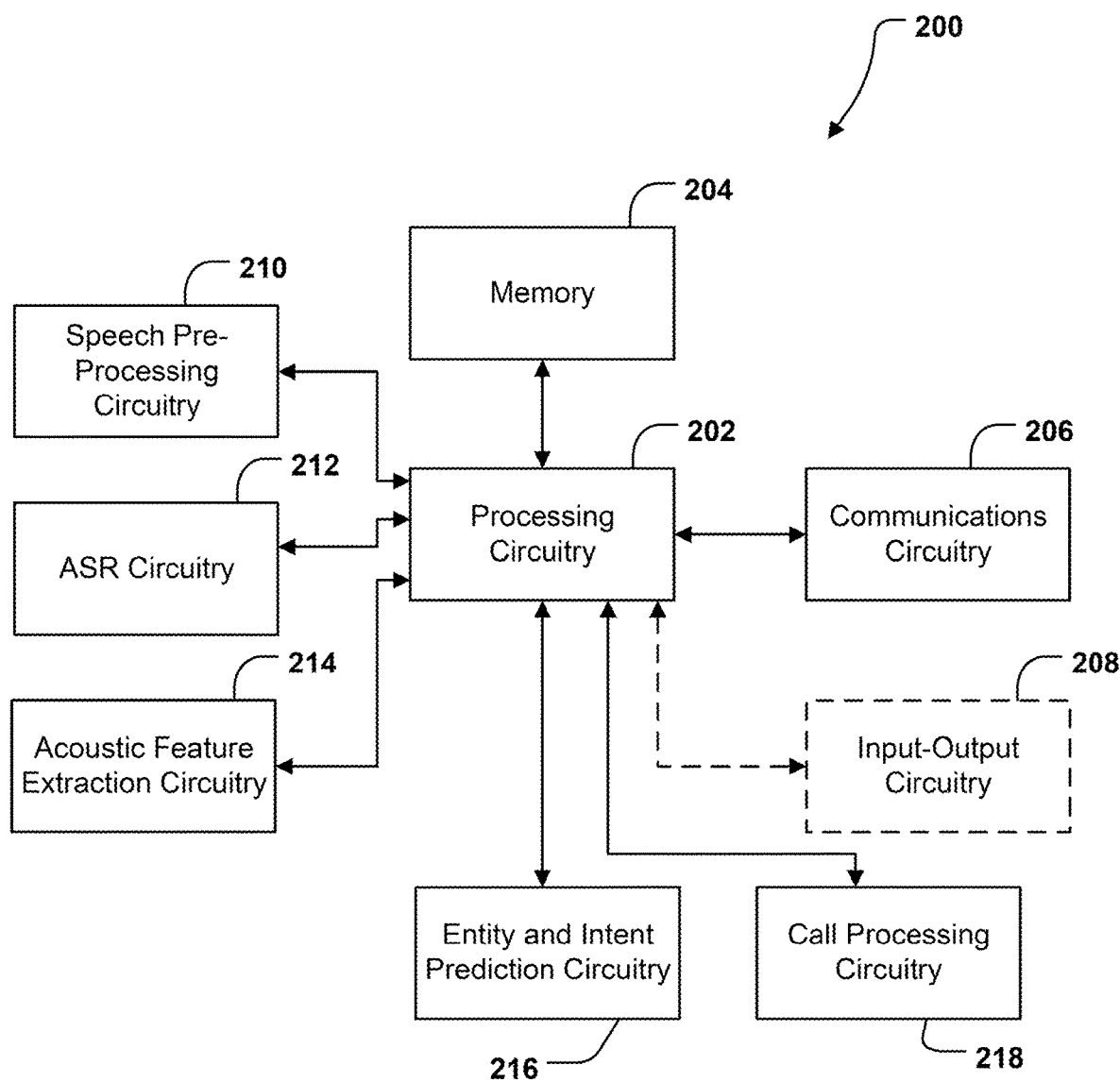
FIG. 2 illustrates a schematic block diagram of example circuitry embodying a device that may perform various operations in accordance with some example embodiments described herein.

System device 104 of the intent and entity prediction system 102 (described previously with reference to FIG. 1) may be embodied by one or more computing devices or servers, shown as apparatus 200 in FIG. 2. As illustrated in FIG. 2, the apparatus 200 may include processor 202, memory 204, communications circuitry 206, input-output circuitry 208, speech pre-processing circuitry 210, automated speech recognition (ASR) circuitry 212, acoustic feature extraction circuitry 214, entity and intent prediction circuitry 216, and call processing circuitry 218 each of which will be described in greater detail below. While the various components are only illustrated in FIG. 2 as being connected with processor 202, it will be understood that the apparatus 200 may further comprises a bus (not expressly shown in FIG. 2) for passing information amongst any combination of the various components of the apparatus 200. The apparatus 200 may be configured to execute various operations described above in connection with FIG. 1 and below in connection with FIGS. 5A-5B.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof.

The processor 202 may be configured to execute software instructions stored in the memory 204 or otherwise accessible to the processor (e.g., software instructions stored on a separate storage device 106, as illustrated in FIG. 1). In some cases, the processor may be configured to execute hard-coded functionality. As such, whether configured by hardware or software methods, or by a combination of hardware with software, the processor 202 represents an entity (e.g., physically embodied in circuitry) capable of performing operations according to various embodiments of the present invention while configured accordingly. Alternatively, as another example, when the processor 202 is embodied as an executor of software instructions, the software instructions may specifically configure the processor 202 to perform the algorithms and/or operations described herein when the software instructions are executed.

Memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, or the like, for enabling the apparatus to carry out various functions in accordance with example embodiments contemplated herein.

The communications circuitry 206 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 206 may include, for example, a network interface for enabling communications with a wired or wireless communication network. For example, the communications circuitry 206 may include one or more network interface cards, antennas, buses, switches, routers, modems, and supporting hardware and/or software, or any other device suitable for enabling communications via a network. Furthermore, the communications circuitry 206 may include the processing circuitry for causing transmission of such signals to a network or for handling receipt of signals received from a network.

The apparatus 200 may include input-output circuitry 208 configured to provide output to a user and, in some embodiments, to receive an indication of user input. It will be noted that some embodiments will not include input-output circuitry 208, in which case user input may be received via a separate device such as a customer device 110A-110N and/or agent device 114A-114N (shown in FIG. 1). The input-output circuitry 208 may comprise a user interface, such as a display, and may further comprise the components that govern use of the user interface, such as a web browser, mobile application, dedicated client device, or the like. In some embodiments, the input-output circuitry 208 may include a keyboard, a mouse, a touch screen, touch areas, soft keys, a microphone, a speaker, and/or other input/output mechanisms. The input-output circuitry 208 may utilize the processor 202 to control one or more functions of one or more of these user interface elements through software instructions (e.g., application software and/or system software, such as firmware) stored on a memory (e.g., memory 204) accessible to the processor 202.

In addition, the apparatus 200 further comprises speech pre-processing circuitry 210 that pre-processes audio input from a customer, agent, or other user and/or may perform other actions or processing regarding audio or text based input from a customer, agent, and/or other user. The speech pre-processing circuitry 210, for example, may separate the pre-processed speech and/or text (received from ASR circuitry 212) into a plurality of discrete segments associated with a time each discrete segment is received and/or associated with each sentence of the speech and/or text. The speech pre-processing circuitry 210 may weight each of the plurality of discrete segments based on a time each discrete segment is received and/or other factors. The speech pre-processing circuitry 210 may utilize processor 202, memory 204, or any other hardware component included in the apparatus 200 to perform these operations, as described in connection with FIGS. 5A-5B below. The speech pre-processing circuitry 210 may further utilize communications circuitry 206 to gather data from a variety of sources (e.g., customer device 110A through customer device 110N, agent device 114A through agent device 114N, or storage device 106, as shown in FIG. 1), may utilize input-output circuitry 208 to receive data from a user, and in some embodiments may utilize processor 202 and/or memory 204 to process audio input from a customer, agent, or other user. The output of the speech pre-processing circuitry 210 may be transmitted to other circuitry of the apparatus 200 (e.g., ASR circuitry 212 and/or acoustic feature extraction circuitry 214). In an embodiment, the speech pre-processing circuitry 210, prior to pre-processing, may capture a reply or speech or a portion of a reply or speech from a customer and/or agent. In another embodiment, the reply or speech or a portion of a reply or speech from a customer and/or agent may be captured by other circuitry and provided or transmitted to the speech pre-processing circuitry 210.

In addition, the apparatus 200 further comprises an ASR circuitry 212 that converts audio to text and may create a context related hidden vector via a context BLSTM network (e.g., an ELMo) included, for example as instructions, in the ASR circuitry 212. The ASR circuitry 212 may also, rather than the speech pre-processing circuitry 210, separate the pre-processed speech and/or text into a plurality of discrete segments associated with a time each discrete segment is received and/or associated with each sentence of the speech and/or text. The ASR circuitry 212 may also, rather than the speech pre-processing circuitry 210, weight each of the plurality of discrete segments based on a time each discrete segment is received and/or other factors. The ASR circuitry 212 may utilize processor 202, memory 204, or any other hardware component included in the apparatus 200 to perform these operations, as described in connection with FIGS. 5A through 5B below. The ASR circuitry 212 may further utilize communications circuitry 206 to gather data from a variety of sources (e.g., customer device 110A through customer device 110N, agent device 114A through agent device 114N, or storage device 106, as shown in FIG. 1), may utilize input-output circuitry 208 to receive data from a user, and in some embodiments may utilize processor 202 and/or memory 204 to convert audio to text, to create a context related hidden vector, and/or create a hidden vector from the context related hidden vector including likelihoods of particular intents. The output of the ASR circuitry 212 may be transmitted to other circuitry of the apparatus 200 (e.g., entity and intent prediction circuitry 216).

In addition, the apparatus 200 may also comprise an acoustic feature extraction circuitry 214 that extracts various features from customer, agent, or other user audio and may create a hidden vector via an included BLSTM network. As used herein, a BLSTM network may refer to a type of neural network, recurrent neural network, or other trained machine learning algorithm, as will be understood by a person skilled in the art. In an embodiment, the portion of audio which various features are extracted from may correspond to the entire speech or audio or to a time of one of the plurality of discrete segments. In an embodiment, the apparatus 200 may extract the various features for each of the one of the plurality of discrete segments. The acoustic feature extraction circuitry 214 may utilize processor 202, memory 204, or any other hardware component included in the apparatus 200 to perform these operations, as described in connection with FIGS. 5A through 5B below. The acoustic feature extraction circuitry 214 may further utilize communications circuitry 206 to gather data from a variety of sources (e.g., customer device 110A through customer device 110N, agent device 114A through agent device 114N, or storage device 106, as shown in FIG. 1), may utilize input-output circuitry 208 to receive data from a user, and in some embodiments may utilize processor 202 and/or memory 204 to create a hidden vector including likelihoods of particular entities and/or intents. The output of the acoustic feature extraction circuitry 214 may be transmitted to other circuitry of the apparatus 200 (e.g., entity and intent prediction circuitry 216).

In addition, the apparatus 200 may also comprise an entity and intent prediction circuitry 216, that, utilizing the speech and text or each of the plurality of discrete segments, outputs a prediction of a customer's, agent's, or other user's intent and/or an entity related to the speech and text or the particular discrete segment (e.g., which entity may be responsible for or able to assist with, for example, a particular request). The entity and intent prediction circuitry 216 may include or store, as instructions, machine learning models or classifiers. Using the machine learning models or classifiers, the entity and intent prediction circuitry 216 may determine, generate, or predict an intent, one or more intents for the speech and/or text or per discrete segment, an entity, one or more entities for the speech and/or text or per discrete segment, or some combination thereof. The entity or one or more entities may be determined via a machine learning model or classifier. The machine learning model or classifier may include a named entity recognition model, custom or custom trained named entity recognition model (e.g., a named entity recognition model trained with data related to entities of a particular organization, and/or business), or other suitable model. Based on words used in the speech, an entity or one or more entities may be determined or an indeterminate entity may be output. The intent or one or more intents may also be determined via another machine learning model or classifier. The machine learning model or classifier may include, for example, a SVM classifier. In particular, the SVM classifier may be a one-vs-rest SVM or a one-vs-one SVM. If more than one intent is determined, the entity and intent prediction circuitry 216 may determine the main intent and sub-intents from the more than one intents, based on a probability or ranking associated with each identified intent. The entity and intent prediction circuitry 216 may utilize processor 202, memory 204, or any other hardware component included in the apparatus 200 to perform these operations, as described in connection with FIGS. 5A through 5B below. The entity and intent prediction circuitry 216 may also determine, via a machine learning model or classifier, the severity of a call (e.g., whether the call is a typical, regular, or normal call or whether the call is an escalated severe and should be escalated).

The entity predicted by the entity and intent prediction circuitry 216 may include a business entity, a product or service entity, business segment, call service entity, call service division or segment, service center, customer service center, or another entity suitable for handling customer calls or issues. For example, a financial institution may include various entities related to particular products or services offered, including, but not limited to, an account entity, a loan entity, a credit card entity, a mortgage entity, an auto loan entity, and/or other entities. In another example, a company that offers products for sales may include various entities, each entity related to a particular type or series of products, a service entity, a warranty entity, a sales entity, an issue related entity, and/or other entities suitable for handling customer calls or issues for any particular reason.

The intent predicted by the entity and intent prediction circuitry 216 may include the reason a customer is calling and/or an issue a customer is attempting to resolve. An intent may be known by the customer. In an example, a customer may call to resolve a particular issue, the resolution to such an issue being the intent. Further, a customer may have one or more intents. Further still, an intent may be unknown by the customer. In other words, the intent predicted may not have been known by the customer or may not have been the original intent of the customer.

The entity and intent prediction circuitry 216 may further utilize communications circuitry 206 to gather data from a variety of sources (e.g., customer device 110A through customer device 110N, agent device 114A through agent device 114N, or storage device 106, as shown in FIG. 1), may utilize input-output circuitry 208 to receive data from a user, and in some embodiments may utilize processor 202 and/or memory 204 to determine or create an entity and/or number or probability indicative of a customer's, agent's, or other user's intent. The output of the entity and intent prediction circuitry 216 may be transmitted to other circuitry of the apparatus 200. The entity and intent prediction circuitry 216 may further determine a next best action for a call based on the entity and the number or probability indicative of the customer's, agent's, or other user's intent. The output of entity and intent prediction circuitry 216 may be transmitted to other circuitry of the apparatus 200 (e.g. call processing circuitry 218).

Finally, the apparatus 200 may also comprise a call processing circuitry 218 that, utilizing the output for the speech and text or each of the plurality of the discrete segments from the entity and intent prediction circuitry 216, may determine and execute the next action. The call processing circuitry 218 may utilize processor 202, memory 204, or any other hardware component included in the apparatus 200 to perform these operations, as described in connection with at least FIGS. 5A through 5B below. The call processing circuitry 218 may further utilize communications circuitry 206 and/or input-output circuitry 208 to perform or execute the next action. For example, the next action may be to transfer a call from an IVR (e.g., IVR 112A-112N) to an agent (e.g., to an agent device 110A-110N). In such examples, the call processing circuitry 218 may facilitate or otherwise cause a call to be re-directed from the IVR to the agent. The call processing circuitry 218 may perform other functions, such as re-directing calls from one particular IVR menu to another, storing a customer's personalized product or service recommendation, re-directing a call based on the customer's personalized product or service recommendation, determining an agent's rating or ranking, and/or generating a call back for a customer. The call processing circuitry 218 may determine a customer's personalized product or service recommendations based on the text of the customer's speech, the context of the speech, the entity or entities determined from the customer's speech, and/or the customer's intent. For example, a customer may call a service center to discuss an overdraft fee or other fee. During replies to an IVR or agent, the customer may mention different products or services. Based on the text, context, and intent associated with such a mention, the call processing circuitry 218 may, after initial issue resolution, recommend a product or service, prompt an agent to recommend a product or service, and/or re-direct the call to an IVR or agent corresponding to the recommended product or service.

In another embodiment, the call processing circuitry 218 may perform other functions. The call processing circuitry 218 may determine product recommendations and/or service recommendations based on text captured during a customer's interaction whether with an IVR or agent. For example, if a customer mentions a credit card or a particular loan, the call processing circuitry 218 may determine that a product or service recommendation includes credit counseling, a new credit card, or a new type of loan, among other products or services. Such product or service recommendations may be given to the customer at varying points during a call (such as, after issue resolution) via an IVR, an agent, as a call-back, and/or via a form of electronic communication (text message, e-mail, etc.), among other suitable communication methods as will be understood by a person skilled in the art. As noted, the call processing circuitry 218 may re-direct calls to different live agents or IVR menus. For example, if a customer mentions a credit card issue, but is currently interacting with a different IVR (e.g., mortgages), the customer may be re-directed to a credit card IVR. The call processing circuitry 218 may further direct calls based on other factors, such as determined entities, customer intent, live agent qualities, characteristics, and/or other objective data (e.g., business unit or group).

Although components 202-218 are described in part using functional language, it will be understood that the particular implementations necessarily include the use of particular hardware. It should also be understood that certain of these components 202-218 may include similar or common hardware. For example, the speech pre-processing circuitry 210, ASR circuitry 212, acoustic feature extraction circuitry 214, entity and intent prediction circuitry 216, and call processing circuitry 218 may each at times leverage use of the processor 202, memory 204, communications circuitry 206, or input-output circuitry 208, such that duplicate hardware is not required to facilitate operation of these physical elements of the apparatus 200 (although dedicated hardware elements may be used for any of these components in some embodiments, such as those in which enhanced parallelism may be desired). Use of the terms "circuitry," and "engine" with respect to elements of the apparatus therefore shall be interpreted as necessarily including the particular hardware configured to perform the functions associated with the particular element being described. Of course, while the terms "circuitry" and "engine" should be understood broadly to include hardware, in some embodiments, the terms "circuitry" and "engine" may in addition refer to software instructions that configure the hardware components of the apparatus 200 to perform the various functions described herein.

Although the speech pre-processing circuitry 210, ASR circuitry 212, acoustic feature extraction circuitry 214, entity and intent prediction circuitry 216, and call processing circuitry 218 may leverage processor 202, memory 204, communications circuitry 206, or input-output circuitry 208 as described above, it will be understood that any of these elements of apparatus 200 may include one or more dedicated processor, specially configured field programmable gate array (FPGA), or application specific interface circuit (ASIC) to perform its corresponding functions, and may accordingly leverage processor 202 executing software stored in a memory (e.g., memory 204), or memory 204, communications circuitry 206 or input-output circuitry 208 for enabling any functions not performed by special-purpose hardware elements. In all embodiments, however, it will be understood that the speech pre-processing circuitry 210, ASR circuitry 212, acoustic feature extraction circuitry 214, and entity and intent prediction circuitry 216 are implemented via particular machinery designed for performing the functions described herein in connection with such elements of apparatus 200.

In some embodiments, various components of the apparatus 200 may be hosted remotely (e.g., by one or more cloud servers) and thus need not physically reside on the corresponding apparatus 200 Thus, some or all of the functionality described herein may be provided by third party circuitry. For example, a given apparatus 200 may access one or more third party circuitries via any sort of networked connection that facilitates transmission of data and electronic information between the apparatus 200 and the third party circuitries. In turn, that apparatus 200 may be in remote communication with one or more of the other components describe above as comprising the apparatus 200.

As will be appreciated based on this disclosure, example embodiments contemplated herein may be implemented by an apparatus 200. Furthermore, some example embodiments may take the form of a computer program product comprising software instructions stored on at least one non-transitory computer-readable storage medium (e.g., memory 204). Any suitable non-transitory computer-readable storage medium may be utilized in such embodiments, some examples of which are non-transitory hard disks, CD-ROMs, flash memory, optical storage devices, and magnetic storage devices. It should be appreciated, with respect to certain devices embodied by apparatus 200 as described in FIG. 2, that loading the software instructions onto a computing device or apparatus produces a special-purpose machine comprising the means for implementing various functions described herein.

Having described specific components of example apparatuses 200, example embodiments of the present disclosure are described below in connection with a series of graphical user interfaces and flowcharts.

GUI

Turning to FIG. 3, a graphical user interface (GUI) 302 is provided that illustrates what an agent sees after a prediction is made. As noted previously, the agent may interact with the intent and entity prediction system 102 by directly engaging with input-output circuitry 208 of an apparatus 200 comprising a system device 104 of the intent and entity prediction system 102. In such an embodiment, the GUI 302 shown in FIG. 3 may be displayed to the agent by the apparatus 200. Alternatively, the agent may interact with the intent and entity prediction system 102 using a separate agent device (e.g., any of agent devices 114A-114N, as shown in FIG. 1), which may communicate with the intent and entity prediction system 102 via communications network 108. In such an embodiment, the GUI 302 shown in FIG. 3 may be displayed to the agent by the agent device.

As described herein, a customer may call a customer service center from a customer device (e.g., any of customer devices 110A-110N, as shown in FIG. 1). The customer may respond to prompts transmitted by an IVR (e.g., any of IVRs 112A-112N). This information may be received by the intent and entity prediction system 102, which may in turn identify the customer's intent, in addition to relevant entities, and may, based on that identified entity and customer intent, cause the call to be transferred from the IVR (e.g., any of IVRs 112A-112N) to an agent device (e.g., one of agent devices 114A-114N). In addition to causing transfer of the call to the agent device, various data points may be transmitted to the agent device. The GUI 302 may thereafter present such information for review by the agent using the agent device. The information may include a customer's personal information, the reason (if known) that a customer called, a customer call history, the current entity handling the call, and the customer's predicted intent. In such examples, the agent receiving the call may receive the call based on the agent's experience handling a particular intent. Knowledge of the customer's predicted intent may allow for the agent to prepare and act appropriately to address the customer more successfully than may otherwise be expected. The forwarding of the call may be based on various other information, such as the caller's additional intents and/or entities and/or other information.

Example Operations

Turning first to FIGS. 4A through 4D, a schematic block diagram 400 is shown that represents an example intent and entity flow, as implemented in the intent and entity prediction system 102 and/or apparatus 200. To perform the operations described below, the apparatus 200 may utilize one or more of processor 202, memory 204, communications circuitry 206, input-output circuitry 208, speech pre-processing circuitry 210, ASR circuitry 212, acoustic feature extraction circuitry 214, entity and intent prediction circuitry 216, call processing circuitry 218, and/or any combination thereof. It will be understood that user interaction with the intent and entity prediction system 102 may occur directly via input-output circuitry 208, or may instead be facilitated by a separate IVR 112A-112N, as shown in FIG. 1, and which may have similar or equivalent physical componentry facilitating such user interaction.

Figure 4A:
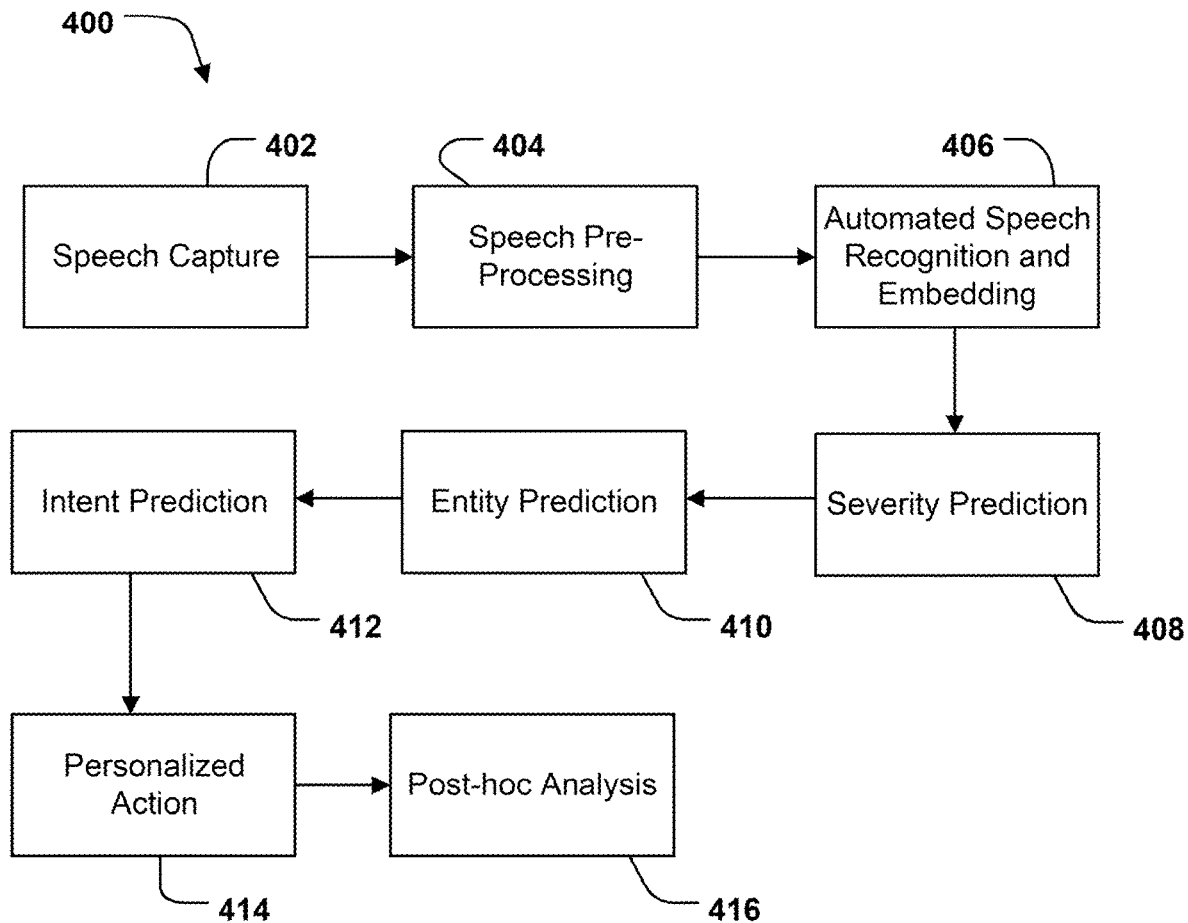
Figure 4D:
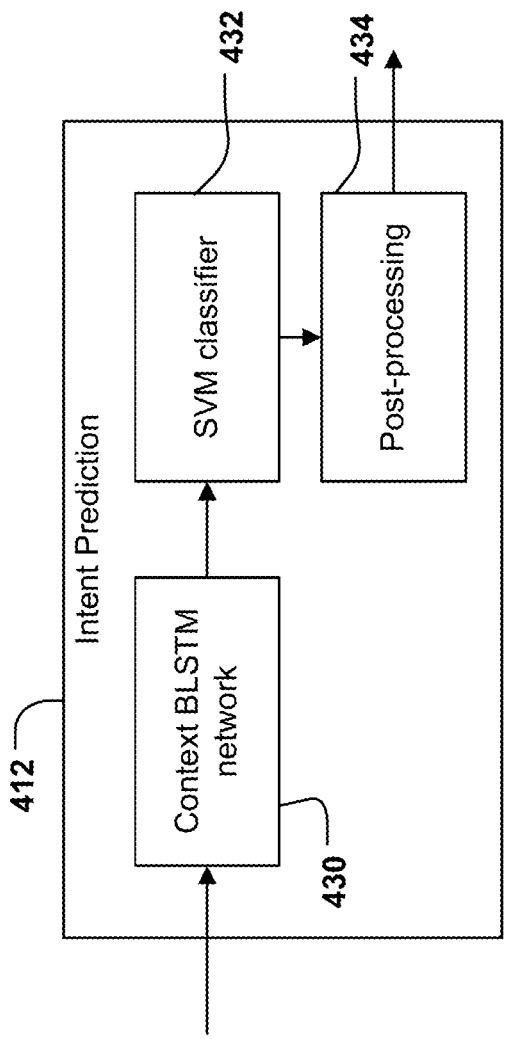

As illustrated in FIG. 4A, such an example may begin with speech capture 402. Circuitry of apparatus 200 (e.g., such as speech pre-processing circuitry 210) may capture or record speech or a reply from a customer, agent, and/or other user at 402. The captured speech may be transmitted for speech pre-processing 404 (e.g., such an operation performed or executed by speech pre-processing circuitry 210). The speech pre-processing 404 may reduce noise of the captured speech, determine an end point of the captured speech, or perform other functions to enable further enable entity and intent prediction. In an embodiment, prior to transfer of the pre-processed the speech, the speech pre-processing circuitry 210 may separate the speech (as audio and/or text) into a plurality of discrete segments. As such, each of the plurality of discrete segments may be analyzed separately, one after the other, or in parallel. After separating the speech and/or text into the plurality of discrete segments, the speech pre-processing circuitry 210 may weight each of the plurality of discrete segment based on various factors (e.g., time, number of predicted intents, and/or other factors).

In another embodiment, at speech pre-processing 404 or at automated speech recognition and embedding 406 acoustic features may be extracted from the pre-processed speech or one of the plurality of discrete segments. Such a feature may be performed or executed by the acoustic feature extraction circuitry 214. Acoustic feature extraction may include extracting or separating each different acoustic feature from the captured pre-processed speech. Such acoustic features may include zero crossing rate, spectral centroid, spectral spread, spectral entropy, spectral flux, spectral roll-off, and/or Mel frequency cepstral coefficients. Each acoustic feature may be transmitted, as a vector or as part of a vector, to one or more of severity prediction 408, entity prediction 410, or intent prediction 412.

In addition, the captured speech, reply, or each of the plurality of discrete segments may be transmitted for automated speech recognition and embedding 406. Such a feature may be performed or executed by ASR circuitry 212 of the apparatus 200. Automated speech recognition and embedding 406 may include converting the pre-processed speech or each of the plurality of discrete segments to text. In another embodiment, prior to transfer to the ASR circuitry 212 the captured speech may not be separated into a plurality of discrete segments. As such, the ASR circuitry 212 may separate the captured speech and/or the text into the plurality of discrete segments. The ASR circuitry 212 may further weight each of the plurality of discrete segments based on various factors (e.g., time, number of intents, and/or other factors).

In an embodiment, the schematic block diagram may include call severity prediction 408, as further illustrated in FIG. 4B, which may predict the severity of a call. The entity and intent prediction circuitry 216 may include a model to determine such a severity, such as the machine learning model/classifier 420. The call severity prediction 408 may include the severity of the call, with a higher or escalated severity requiring more urgent attention and a lower or regular severity requiring less urgent attention. For example, a call may be a typical or regular call or an escalated severity call. A regular call may be transferred along normal routes, depending on other factors (e.g., intents and/or entities). Handling of an escalated severity or high severity call may be expedited, such that the call is escalated or transferred directly to an agent capable of handling such a call without moving through the normal call routing pathways. In another embodiment, based on a prediction of a severe call, the next action may include, at least, transferring the call to a live agent, rather than another IVR. As noted, the entity and intent prediction circuitry 216 may include a model/classifier. The model/classifier may include a trained model. The type of machine learning model may include a linear regression model, a logistic regression model, a decision tree model, a SVM model, a Naive Bayes model, a kNN model, a k-means model, a random forest model, a dimensionality reduction model, a neural network, a gradient boosted algorithm/model, and/or other suitable models, as will be understood by a person skilled in the art. If the call is severe, the entity and intent may be predicted, as will be described below, and then the next action (e.g., transfer to an agent, as the call is severe) executed. As illustrated in FIG. 4B, the call severity prediction 408 may include several sub-routines or instructions. For example, call severity prediction 408 may or may not include a context BLSTM network 418, while in another embodiment, context hidden vectors may be created prior to the call severity prediction. The ML model/classifier 420 may take the context hidden vectors or one of the plurality of discrete segments and output a number indicating a severity. In another embodiment, the number may be from 0 to 1, the number indicating a likelihood that the call is severe or normal. An optional post-processing 422 operation or step may format the output to a usable format and/or associate the probability with a weight.

Once the severity is determined or predicted, an entity or entities may be predicted for the speech and/or text or for each of the one or more discrete segments at entity prediction 410. Prior to analyzing any of the speech and/or text or discrete segments, the speech and/or text or discrete segment may be passed or transmitted to a context BLSTM network 424 to form context hidden vectors. Such a step may occur prior to or separate from the entity prediction, e.g., the input to entity prediction 410 may be a context hidden vector. The entity and intent prediction circuitry 216 may include a model to determine the entities, such as the named entity recognition model 426 illustrated in FIG. 4C, a customized named entity recognition model, another context model, and/or other suitable machine learning model as will be understood by those skilled in the art. A speech, which may be comprised of the plurality of discrete segments, may potentially relate to more than one entity. In other words, an entity prediction 410 may output one or more entities. The entities may be weighted according to or correspondingly with the weighted discrete segments or based on other factors. As such, the highest weighted entity and/or most identified and highest weighted entity may be the entity that the call is transferred to. If more than one entity is determined, the remaining entities may be saved and utilized in a personalized recommendation or follow up action. The output of the model or classifier may be a number indicating a particular entity. In another example, the output may be a string or text string indicating the entity. Such steps or operations, e.g., weighting or determining a main entity, may be performed as a post-processing 428 operation.

Once the one or more entities are determined, one or more intents may be determined at intent prediction 412. Prior to analyzing any of the speech and/or text or discrete segments, the speech and/or text or discrete segment may be passed or transmitted to a context BLSTM network 430 to form context hidden vectors. Such a step may occur prior to or separate from the intent prediction, e.g., the input to intent prediction 412 may be a context hidden vector. The entity and intent prediction circuitry 216 may include a model to determine the entities, such as the SVM classifier 432 illustrated in FIG. 4D, a one-vs-one SVM model, a one-vs-rest SVM model, and/or other suitable machine learning model as will be understood by those skilled in the art. In an embodiment, one or more intents may be determined for each of the plurality of discrete segments. A relevancy score may be determined for each of the one or more intents. Such a relevancy score may be determined via the SVM classifier 432 or another machine learning model/classifier. The one or more intents may be ranked based on the relevancy score. The highest ranked intent for the speech and/or text or for each discrete segment may be the main intent for the speech and/or text or each discrete segment. Once each of the intents for the speech and/or text or each of the discrete segments are determined, the highest ranked and/or highest weighted intent may be selected as the main overall intent. The main overall intent may be used to determine the next action. Other machine learning models may be utilized. The output may be a number indicating a particular intent. In another embodiment, the output may be a vector including a series of intents and associated likelihoods of being the actual intent of the customer. Such steps or operations, e.g., weighting or determining a main intent and sub-intents, may be performed as a post-processing 434 operation.

Turning back to FIG. 4A, once the severity, one or more entities, and/or one or more intents for a call are generated (e.g., once the severity of the call, one or more entities, and one or more intents are determined or predicted), a personalized action 414 may be determined. All the obtained determinations and/or predictions for a discrete segment may be analyzed in relation to the metadata or the determined entities, intents, and related weights of each other discrete segment. Based on such analysis, a next action may be determined. For example, if a call is severe, the personalized or next action may be to transfer the call to an agent of a particular determined or predicted entity. In another example, for a normal call, the personalized or next action may include transferring the call to a particular IVR or an agent or delivering a particular question, each option based on the one or more entities and one or more intents. In yet another example, a next action may be to transfer the call to a particular IVR associated with a resolution to a particular intent. Such an IVR may initiate and guide a customer through a process leading to resolution of the associated intent. For example, one intent may include resolving a debit card decline. In such examples, the next action may include transferring the call to an IVR associated with the resolution of a debit card being declined, such as a "low balance alert" enrollment. The analysis described above may be performed at each step in or portion of a customer interaction (e.g., for each customer reply or speech, a personalized or next action may be determined). In an embodiment, the personalized or next action may include several steps or stages. For example, a first action may be to transfer a call to a particular agent. Once a resolution is reached, the next action may be to suggest a product or service, based on the determinations and/or predictions described above.

After the personalized actions are performed, post-hoc analysis 416 may be performed. The post-hoc analysis may include determining how an agent performed based on whether a call was directed to the proper IVR and/or determining whether a call was directed to the proper entity, among other analysis.

Such actions or functions, as described in relation to FIGS. 4A through 4D, may be performed, stored in, and/or executed by the circuitry of apparatus 200 and/or the intent and entity prediction system 102. For example, each BLSTM network or other models/classifiers (e.g., ML model/classifier 420, a named entity recognition model 426, or SVM classifier 432) in FIGS. 4B through 4D may be stored, as instructions, in memory 204 and/or the entity and intent prediction circuitry 216 and may be utilized by the entity and intent prediction circuitry 216.

Figure 5A:
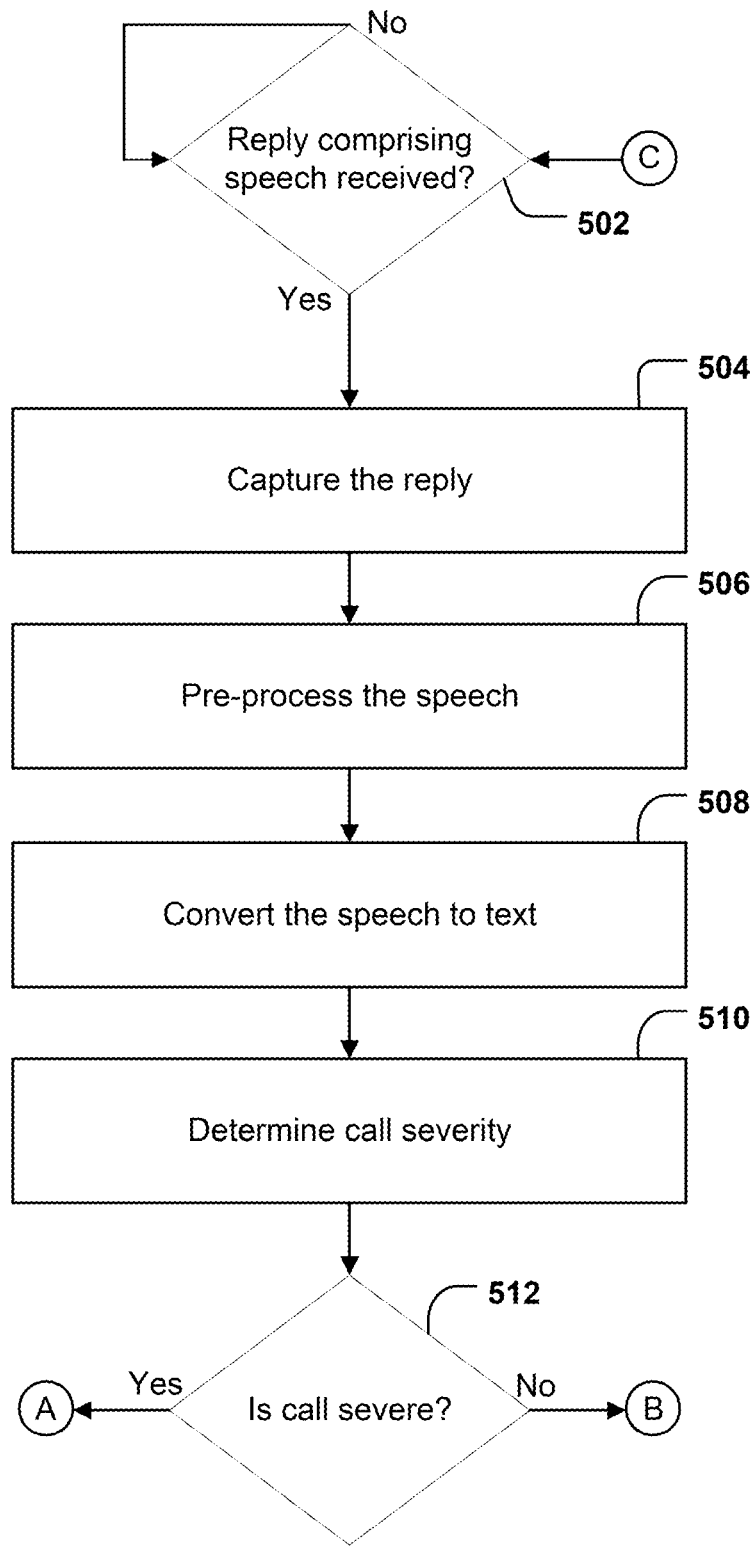
FIGS. 5A and 5B illustrate example flowcharts for generating an entity and intent prediction and determining a next action or call routing, in accordance with some example embodiments described herein.
Figure 5B:
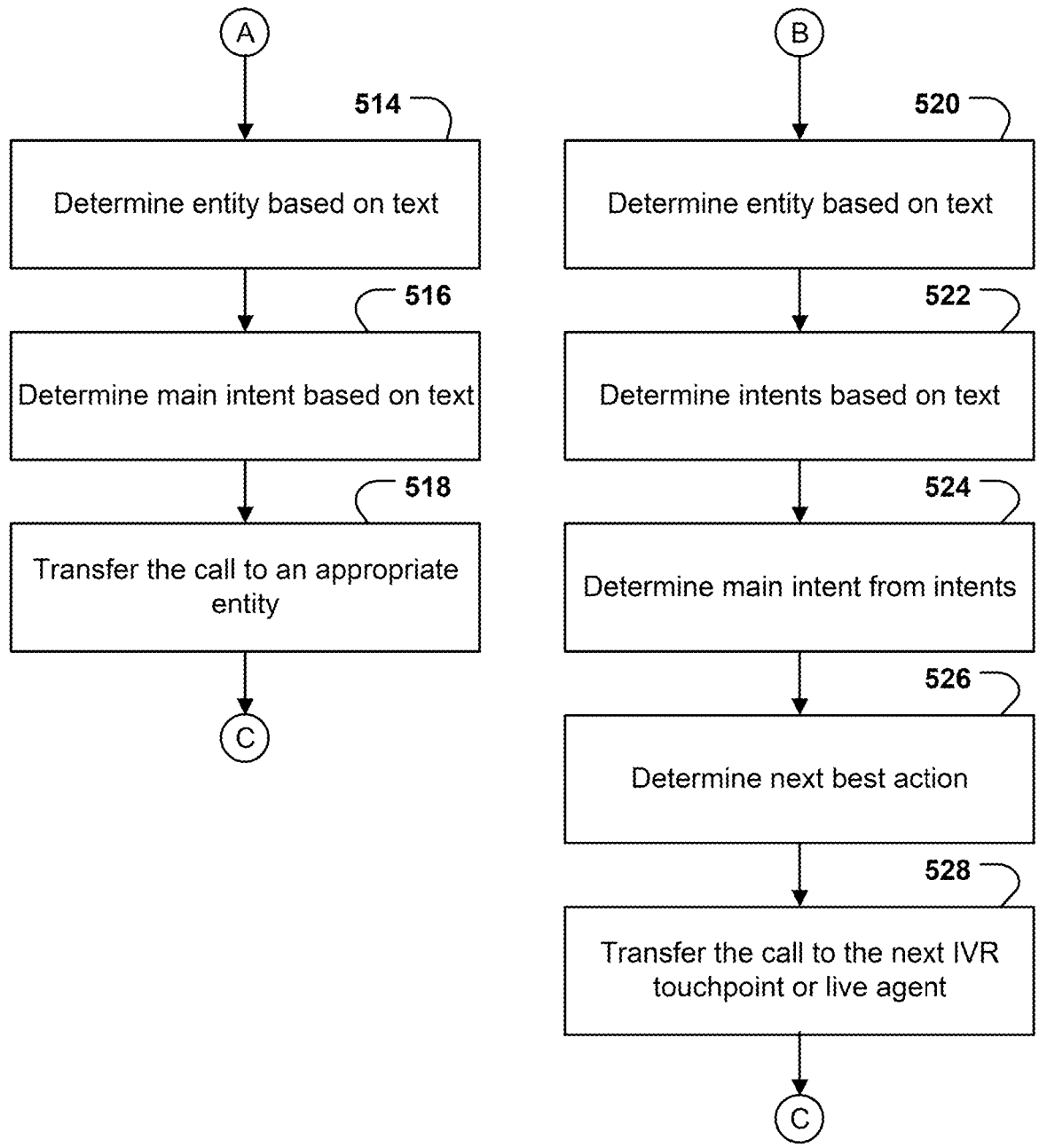

Turning to FIGS. 5A and 5B, example flowcharts are illustrated that contain example operations implemented by example embodiments described herein. The operations illustrated in FIGS. 5A and 5B may, for example, be performed by system device 104 of the intent and entity prediction system 102 shown in FIG. 1, which may in turn be embodied by an apparatus 200, which is shown and described in connection with FIG. 2. To perform the operations described below, the apparatus 200 may utilize one or more of processor 202, memory 204, communications circuitry 206, input-output circuitry 208, speech pre-processing circuitry 210, ASR circuitry 212, acoustic feature extraction circuitry 214, entity and intent prediction circuitry 216, call processing circuitry 218, and/or any combination thereof. It will be understood that user interaction with the intent and entity prediction system 102 may occur directly via input-output circuitry 208, or may instead be facilitated by a separate IVR 112A-112N, as shown in FIG. 1, and which may have similar or equivalent physical componentry facilitating such user interaction. Further, the prediction of entity and intent may be one prediction or data point to determine the next best action.

As shown by operation 502, the apparatus 200 includes means, such as processor 202, communications circuitry 206, input-output circuitry 208, speech pre-processing circuitry 210, or the like, for determining whether a reply has been received or is being received in response to a prompt or question. Such a feature may be performed in IVR circuitry or systems, such as any of the IVRs 112A-112N, or other automated systems. The reply may comprise speech of a customer during a customer call.

As shown by operation 504, the apparatus 200 includes means, such as processor 202, communications circuitry 206, input-output circuitry 208, speech pre-processing circuitry 210, or the like, for capturing speech from a customer. Speech or a reply may be captured in response to a determination that a customer has or is beginning to reply. The capture of speech may be performed in response to a customer providing a vocal response to a prompt. As the customer starts speaking, the customer's response may be recorded by, for example, the speech pre-processing circuitry 210 or other circuitry included in apparatus 200. As the customer proceeds through different responses, each segment of speech may be recorded. In another example, the customer may be responding to an agent. In addition to the capture of the customer's speech, the agent's speech may be captured and processed. As such, intent may be predicted for a customer, an agent, and/or some other user. The intent may comprise a purpose for the call, and the purpose for the call may be known or unknown by the customer.

As shown by operation 506, the apparatus 200 includes means, such as speech pre-processing circuitry 210 or the like, for pre-processing the speech. The speech pre-processing circuitry 210 may reduce any noise, background noises, other voices not relevant to the conversation, and/or other anomalies. The speech pre-processing circuitry 210 may reduce noise, background noise, background voices, and/or other noise, by amplifying high frequencies and/or via other denoising techniques as will be understood by those skilled in the art. Further, speech pre-processing circuitry 210 may determine when the speech begins and/or ends (e.g., a speech endpoint). In an embodiment, the speech beginning point and/or end point may be determined (e.g., detected) via the use of different frequencies (e.g., high and low frequencies) and time domains. For example, background noise, which may be at a specific frequency, may be removed. Other background voices may be removed as well. Finally, based on time and the absence of any other frequencies, the speech end point may be determined.

As shown by operation 508, the apparatus 200 includes means, such as ASR circuitry 212 or the like, for converting the speech to text. The ASR circuitry 212 may convert a portion or all of a customer's and/or agent's response. In other words, when determining an intent of a customer, the ASR circuitry 212 may convert the customer's speech to text. In another embodiment, the ASR circuitry 212 may convert the customer's and agent's speech to text. In another embodiment, the ASR circuitry may convert each of the plurality of discrete segments to text. In yet another embodiment, the ASR circuitry may convert audio to text and the separate the text into a plurality of discrete segments.

As shown by operation 510, the apparatus 200 includes means, such as speech pre-processing circuitry 210, ASR circuitry 212, entity and intent prediction circuitry 216 or the like, for determining a call severity. The severity of a call may be determined by transmitting the text of the call or context hidden vectors, as generated by a context BLSTM network, to a trained machine learning model or classifier. The machine learning model or classifier may output a probability or likelihood indicating the severity of a call. Such a probability or likelihood may be indicated by a number between 0 and 1. Based on a predefined threshold, an output above such a threshold may indicate the call is severe, while an output at or below such a threshold may indicate that the call is a regular call.

As shown by operation 512, the apparatus 200 includes means, such as speech pre-processing circuitry 210, ASR circuitry 212, entity and intent prediction circuitry 216 or the like, for, based on a whether a call is severe or not, proceeding to perform specified operations. If the call is determined to be severe, the call may proceed to operation 514 to determine intent and entity, and then transfer to an appropriate agent, as described below. If the call is determined to be a regular call, the call may proceed to operation 520 to determine intent, entity, and next best action, and then execution of the next best action.

As shown by operation 514, the apparatus 200 includes means, such as entity and intent prediction circuitry 216 or the like, for determining an entity based on text. The entity and intent prediction circuitry 216 may include a model or classifier to determine one or more entities for a discrete segment. The model or classifier may, based on the input (e.g., the discrete segment or a context hidden vector), generate one or more probabilities or likelihoods that the input is indicating one or more entities. In another embodiment, the output may indicate a most likely entity. In yet another embodiment, the output may indicate a main entity and potential sub-entities. For example, a customer may call to discuss a missed mortgage payment, but also mention a potential personal loan or credit card. In such an example, based on a customer's speech, a main entity may be identified, via output from the entity and intent prediction circuitry 216, as being related to mortgages, while a sub-entity may be identified, entity and intent prediction circuitry 216, related to personal loans or credit.

As shown by operation 516, the apparatus 200 includes means, such as entity and intent prediction circuitry 216 or the like, for determining a main intent based on the text. The entity and intent prediction circuitry 216 may include a model or classifier to determine one or more intents for a discrete segment. The model or classifier may, based on the input (e.g., the discrete segment or a context hidden vector), generate one or more probabilities or likelihoods that the input is indicating one or more intents. In another embodiment, the output may indicate a most likely intent. In yet another embodiment, the output may indicate a main intent and potential sub-intents. The main intent may be determined based on a ranking of each intent. The ranking of each intent may be based on a generated or determined relevancy score of each of the intents. The highest ranked intent may be classified or labeled as the main intent, while the remaining intents may be considered, classified, or labeled as sub-intents. In an embodiment, each intent may be assigned an indicator or classified such that an intent is either a main intent or a sub-intent. In such embodiments, the assigned indicator may be stored as data in memory (e.g., storage device 106 and/or memory 204), the indicator to correspond to or relate to a particular intent.

As shown by operation 518, the apparatus 200 includes means, such as call processing circuitry 218 or the like, for transferring the call to the appropriate agent. The appropriate agent may be determined based on the one or more determined intents or main intent, an entity or one or more entities, and/or any determined sub-intents.

As shown by operation 520, the apparatus 200 includes means, such as entity and intent prediction circuitry 216 or the like, for determining an entity based on the text. The entity and intent prediction circuitry 216 may include a model or classifier to determine one or more entities for a discrete segment. The model or classifier may, based on the input (e.g., the discrete segment or a context hidden vector), generate one or more probabilities or likelihoods that the input is indicating one or more entities. In another embodiment, the output may indicate a most likely entity. In yet another embodiment, the output may indicate a main entity and potential sub-entities. For example, a customer may call to discuss a missed mortgage payment, but also mention a potential personal loan or credit card. In such an example, based on a customer's speech, a main entity may be identified, via output from the entity and intent prediction circuitry 216, as being related to mortgages, while a sub-entity may be identified, entity and intent prediction circuitry 216, related to personal loans or credit.

As shown by operation 522, the apparatus 200 includes means, such as entity and intent prediction circuitry 216 or the like, for determining intents based on the text. The entity and intent prediction circuitry 216 may include a model or classifier to determine one or more intents for a discrete segment. The model or classifier may, based on the input (e.g., the discrete segment or a context hidden vector), generate one or more probabilities or likelihoods that the input is indicating one or more intents. In another embodiment, the output may indicate a most likely intent.

As shown by operation 524, the apparatus 200 includes means, such as entity and intent prediction circuitry 216 or the like, for determining a main intent from the intents. In yet another embodiment, the output may indicate a main intent and potential sub-intents. The main intent may be determined based on a ranking of each intent. The ranking may be based on a relevancy score for each of the intents. The highest ranked intent may be classified as the main intent, while the remaining intents may be considered sub-intents.

As shown by operation 526, the apparatus 200 includes means, such as entity and intent prediction circuitry 216, call processing circuitry 218, or the like, for determining a next best action. A model, classifier, or other suitable set of instructions may receive as input, each of the weighted discrete segments and corresponding severity, entity, and/or intent. Based on the input, the model, classifier, or other suitable set of instructions may determine the next best action. In some embodiments, the next action is determined based on relevancy scores for the one or more intents. In some embodiments, the next action is determined based primarily (or, in some cases, exclusively) on the main intent. The next best action may include transferring the call to an agent, transferring the call to a particular agent capable of handling particular intents, transferring the call to an agent or IVR related to a particular entity, and/or prompting a user response via a particular question, among other actions. In an embodiment, multiple next actions may be determined. For example, a next action may be determined and one or more follow up (e.g., additional) actions may be determined as well. After the next action is executed or completed, one of the one or more follow up actions may be performed. To do this, the apparatus 200 may receive an indication that the next action is complete and, in response to receiving this indication, may perform (or cause performance of) the additional actions. The follow up actions may be based on any additional entities and/or any of the sub-intents.

As shown by operation 528, the apparatus 200 includes means, such as call processing circuitry 218 or the like, for transferring the call to the next IVR touchpoint or a live agent. The call processing circuitry 218 may execute the next best action.

In an embodiment, the system may continue to scan for responses and continue to perform the operations as described for FIGS. 5A and 5B until the call has ended or a new call has begun.

As described above, example embodiments provide methods and apparatuses that enable improved intent and entity prediction and call resolution. Example embodiments thus provide tools that overcome the problems faced by typical intent prediction systems. By utilizing text and audio vectors, a more accurate prediction may be made. The additional use of intent and entity prediction further enables prompt and proper resolution and increased customer satisfaction. Moreover, embodiments described herein improve accuracy of predictions. The use of multiple machine learning algorithms, re-trained or refined by data produced in each subsequent execution of operations, provide for a more accurate prediction, ensuring a customer's call is resolved.

As these examples all illustrate, example embodiments contemplated herein provide technical solutions that solve real-world problems faced during customer calls with customers exhibiting anger or otherwise unsatisfactory emotions. And while customer satisfaction has been an issue for decades, the introduction of IVRs has introduced longer wait times and further frustrated customers, as navigation takes time and does not always result in proper call routing. As the demand for faster resolution times and customer satisfaction significantly grows, a solution to resolve this issue does not exist. At the same time, the recently arising ubiquity of speech capture and machine learning has unlocked new avenues to solving this problem that historically were not available, and example embodiments described herein thus represent a technical solution to these real-world problems.

FIGS. 4A through 5B illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be embodied by software instructions. In this regard, the software instructions which embody the procedures described above may be stored by a memory of an apparatus employing an embodiment of the present invention and executed by a processor of that apparatus. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a computer-readable memory that may direct a computing device or other programmable apparatus to function in a particular manner, such that the software instructions stored in the computer-readable memory produce an article of manufacture, the execution of which implements the functions specified in the flowchart blocks. The software instructions may also be loaded onto a computing device or other programmable apparatus to cause a series of operations to be performed on the computing device or other programmable apparatus to produce a computer-implemented process such that the software instructions executed on the computing device or other programmable apparatus provide operations for implementing the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

In some embodiments, some of the operations above may be modified or further amplified. Furthermore, in some embodiments, additional optional operations may be included. Modifications, amplifications, or additions to the operations above may be performed in any order and in any combination.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for predicting an entity and intent based on captured speech, the method comprising:
   receiving, by a communications circuitry and based on prompts from an Interactive Voice Response (IVR) system, a reply comprising speech during a customer call;
   separating, by automated speech recognition circuitry, the speech into a plurality of discrete speech segments, wherein the separating is based on a time each of the plurality of discrete speech segments is received;
   extracting, by the automated speech recognition circuitry, acoustic features from each of the plurality of discrete speech segments;
   converting, by the automated speech recognition circuitry, each of the plurality of discrete speech segments to a corresponding discrete text segment;
   causing, by an entity and intent prediction circuitry, generation of a plurality of entities and a plurality of intents for each of the acoustic features and each corresponding discrete text segment, wherein the plurality of entities and the plurality of intents for each of the acoustic features are generated in parallel with the plurality of entities and the each plurality of intents for each corresponding discrete text segment; and
   redirecting, by a call processing circuitry, the customer call from the IVR system to an agent device based on the plurality of entities and the plurality of intents.

2. The method of claim 1, further comprising:
   causing, by the entity and intent prediction circuitry, generation of a relevancy score for each intent of the plurality of intents.

3. The method of claim 2, wherein the redirecting is determined based on every generated relevancy score.

4. The method of claim 2, further comprising:
ranking, by the entity and intent prediction circuitry, each intent of the plurality of intents based on its corresponding relevancy score; and
classifying, by the entity and intent prediction circuitry, each intent of the plurality of intents as a main intent or a sub-intent based on the ranking.

5. The method of claim 4, wherein the redirecting is further based on the main intent.

6. The method of claim 5, further comprising:
determining, by the call processing circuitry, one or more additional actions based on each entity of the one or more plurality of entities and each intent of the plurality of intents classified as sub-intents.

7. The method of claim 6, further comprising:
in response to receiving an indication that the redirecting is complete, performing the one or more additional actions.

8. The method of claim 1, wherein each entity of the plurality of entities comprise one or more of a business entity, a product or service entity, business segment, call service entity, call service division or segment, service center, or customer service center.

9. The method of claim 1, wherein each intent of the plurality of intents comprise a purpose for the customer call.

10. The method of claim 9, wherein the purpose for the customer call is known or unknown by the customer.

11. The method of claim 1, wherein the entity and intent prediction circuitry includes a custom named entity recognition model, and wherein generation of the plurality of entities uses the custom named entity recognition model.

12. The method of claim 1, further comprising:
further comprising, prior to the redirecting, determining, by the entity and intent prediction circuitry, a severity based on the speech and the text, and wherein the redirecting is further based on the severity.

13. The method of claim 12, wherein the severity is either a regular severity or an escalated severity.

14. The method of claim 13, wherein, if the severity is an escalated severity, the redirecting includes transferring a call associated with the speech and text to an agent.

15. An apparatus for predicting an entity and intent based on captured speech, the apparatus comprising:
communications circuitry configured to receive, based on prompts from an Interactive Voice Response (IVR) system, a reply comprising speech during a customer call;
automated speech recognition circuitry configured to:
separate the speech into a plurality of discrete speech segments, wherein the separating is based on a time each of the plurality of discrete speech segments is received,
extract acoustic features from each of the plurality of discrete speech segments, and
convert each of the plurality of discrete speech segments to a corresponding discrete text segment;
entity and intent prediction circuitry configured to cause generation of a plurality of entities and a plurality of intents for each of the acoustic features and each corresponding discrete text segment, wherein the plurality of entities and the plurality of intents for each of the acoustic features are generated in parallel with the plurality of entities and the plurality of intents for each corresponding discrete text segment; and
call processing circuitry configured to redirect the customer call from the IVR system to an agent device based on each of the plurality of entities and each of the plurality of intents.

16. The apparatus of claim 15, wherein the entity and intent prediction circuitry causes generation of a relevancy score for each intent of the plurality of intents.

17. The apparatus of claim 16, wherein the entity and intent prediction circuitry ranks each intent of the plurality of intents based on the relevancy score.

18. The apparatus of claim 17, wherein the entity and intent prediction circuitry uses a one vs. rest support vector machine model to generate the relevancy score for each intent of the plurality of intents and to rank each intent of the one or more plurality of intents.

19. A computer program product for predicting an entity and intent based on captured speech, the computer program product comprising at least one non-transitory computer-readable storage medium storing software instructions that, when executed, cause an apparatus to:
receive, based on prompts from an Interactive Voice Response (IVR) system, a reply comprising speech during a customer call;
separate the speech into a plurality of discrete speech segments, wherein the separating is based on a time each of the plurality of discrete speech segments is received;
extract acoustic features from each of the plurality of discrete speech segments;
convert each of the plurality of discrete speech segments to a corresponding discrete text segment;
cause generation of a plurality of entities and a plurality of intents for each of the acoustic features and each corresponding discrete text segment, wherein the plurality of entities and the plurality of intents for each of the acoustic features are generated in parallel with the plurality of entities and the plurality of intents for each corresponding discrete text segment; and
redirect the customer call from the IVR system to an agent device based on each of the plurality of entities and each of the plurality of intents.

20. The computer program product of claim 19, wherein the software instructions, when executed, further cause the apparatus to:
cause generation of a severity based on the plurality of discrete speech segments and each corresponding discrete text segment.

21. The computer program product of claim 19, wherein the redirecting comprises one or more of re-directing the customer call from an IVR menu to another IVR menu, selecting an agent based on the plurality of entities and the plurality of intents, generating a customer's personalized product or service recommendation, re-directing the customer call based on the customer's personalized product or service recommendation, determining an agent's rating or ranking, or generating a call back for a customer.

* * * * *

UNITED STATES PATENT AND TRADEMARK OFFICE
CERTIFICATE OF CORRECTION

PATENT NO. : 12,183,344 B1
APPLICATION NO. : 17/456491
DATED : December 31, 2024
INVENTOR(S) : Venkataraman et al.

Page 1 of 1

It is certified that error appears in the above-identified patent and that said Letters Patent is hereby corrected as shown below:

In the Claims

In Column 23, Lines 12-13 (Claim 6), delete "one or more"; and

In Column 24, Line 18 (Claim 18), delete "one or more".

Signed and Sealed this
Second Day of September, 2025

Coke Morgan Stewart
*Acting Director of the United States Patent and Trademark Office*